United States Patent [19]
Tamai

[11] Patent Number: 5,311,434
[45] Date of Patent: May 10, 1994

[54] VEHICLE NAVIGATION SYSTEM

[75] Inventor: Haruhisa Tamai, Higashimatsuyama, Japan

[73] Assignee: Zexel Corporation, Tokyo, Japan

[21] Appl. No.: 922,606

[22] Filed: Jul. 31, 1992

[30] Foreign Application Priority Data

Aug. 5, 1991 [JP] Japan .................. 3-218054

[51] Int. Cl.$^5$ ............................................. G06F 15/50
[52] U.S. Cl. ................................... 364/449; 364/444; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,774,671 | 9/1988 | Itoh et al. | 364/449 |
| 4,926,336 | 5/1990 | Yamada | 340/990 |
| 5,031,104 | 7/1991 | Ikeda et al. | 340/990 |
| 5,159,556 | 10/1992 | Schorter | 364/443 |
| 5,168,452 | 12/1992 | Yamada et al. | 340/995 |
| 5,184,303 | 2/1993 | Link | 340/995 |

Primary Examiner—Gary Chin
Attorney, Agent, or Firm—Pollock, Vande Sande & Priddy

[57] ABSTRACT

In a vehicle navigation system having memory for storing road map information, calculating unit for calculating the optimum route from a given initial location to the destination and display device for sequentially displaying the directions in which the vehicle operator should drive to follow the route, the system comprises a command unit for commanding the calculating unit to recalculate the route when the vehicle deviates from the route and halt/resume unit for halting and resuming the operation of the calculating unit. When the operator decides to make a temporary deviation from the calculated route, he can use the halt/resume unit to prevent the system from recalculating the route when he leaves it and then can use it again to restart the route guidance when he return to it. This prevents unnecessary calculations from being made.

9 Claims, 10 Drawing Sheets

VEHICLE NAVIGATION SYSTEM

BACKGROUND OF THE INVENTION

1. Field of the Invention

This invention relates to a vehicle navigation system for providing the vehicle operator or his or her assistant with information regarding the route from a given initial location to a given destination.

2. Description of the Prior Art

There have been proposed various so-called route guidance type vehicle navigation systems equipped with an appropriate display device for providing the vehicle operator etc. with information regarding the route to be followed from the current vehicle location to a given destination.

Typically, the vehicle navigation systems of this type are arranged to store road map information as digital data, calculate the route between the current location and the destination upon receiving the two locations as input, and providing the operator with route guidance information at appropriate times as the vehicle navigates the route. The guidance information is output shortly before the vehicle reaches each intersection, for example, and instructs the operator as to whether he or she should continue straight ahead, turn right or turn left.

If a vehicle being guided by such a prior art route guidance navigation system should stray from the route along which it is being guided in the course of the series of route guidance steps executed in accordance with the calculated route, a fresh calculation is made for determining the route between the off-route location of the vehicle at that time and the destination and a different series of route guidance steps are executed for guiding the vehicle from the location to which it has strayed to the destination.

The deviation of the vehicle from the calculated route may occur accidentally owing to an operator error or may be deliberate, as when the operator pulls into a service station or a restaurant parking lot. In the latter case, the operator almost always eventually returns to the original route.

As the prior art systems invariably have to recalculate the route to the destination even when the operator only temporarily deviates from the calculated route for some reason or other, they frequently end up conducting unnecessary calculations that involve the operator and thus increase the number of tasks the operator has to perform.

SUMMARY OF THE INVENTION

An object of the invention is therefore to provide an improved vehicle navigation system which overcomes the aforesaid drawbacks of the prior art technology.

Another object of the invention is to provide a vehicle navigation system which enables the vehicle operator to resume travel along the original guidance route after having once deviated from the route, by a simple operation that does not require re-input of the destination or other such bothersome tasks.

Another object of the invention is to provide a vehicle navigation system which enables the operator to resume travel from an arbitrary point of the original guidance route after having once deviated from the route, without need for recalculating the route.

For realizing these objects, the invention provides a vehicle navigation system comprising first means for inputting initial location data indicating the initial location of the vehicle, memory means for storing road map information, second means for inputting destination data indicating a destination, calculation means responsive to the first means, the memory means and the second means for calculating a route from the initial location to the destination, storage means for storing the result of the calculation by the calculation means, output means for outputting current location data indicating the current location of the vehicle, display means responsive to the storage means and the output means for in the course of vehicle travel sequentially displaying directions in which the vehicle should proceed, command means for commanding the calculation means to recalculate the route when the vehicle deviates from the route, and halt/resume means for halting and resuming the operation of the calculating means.

The calculation means calculates the route from the initial location to the destination on the basis of the road map information stored in the memory means. Information relating to the calculated route is stored in the storage means as original route guidance information. Based on this information stored in the storage means, guidance instructions for guiding the vehicle from the initial location to the destination are displayed in an appropriate form on the display means sequentially in response to vehicle travel. When the vehicle deviates from the route, the command means commands the calculation means to recalculate the route.

If in the course of being guided in this manner the operator decides to deviate from the calculated route deliberately, such as for stopping by a service station, restaurant or the like, he or she can use the halt/resume means for stopping the operation of the route calculation means. Then when the vehicle is back on the original route, the operator only needs to operate the halt/resume means for restarting the operation of the calculation means and the route guidance to the destination will resume from a point just before that at which it was suspended. Thus route recalculation can be halted during the period that the vehicle is not on the route.

It is possible that the operator may return to the original route at some point other than that at which he or she left it. Even in such cases, similar operation of the halt/resume means will provide similar results.

This invention will be better understood and other objects and advantages thereof will be more apparent from the following detailed description of preferred embodiments with reference to the accompanying drawings.

DETAILED DESCRIPTION OF THE PREFERRED EMBODIMENT

Figure 1:
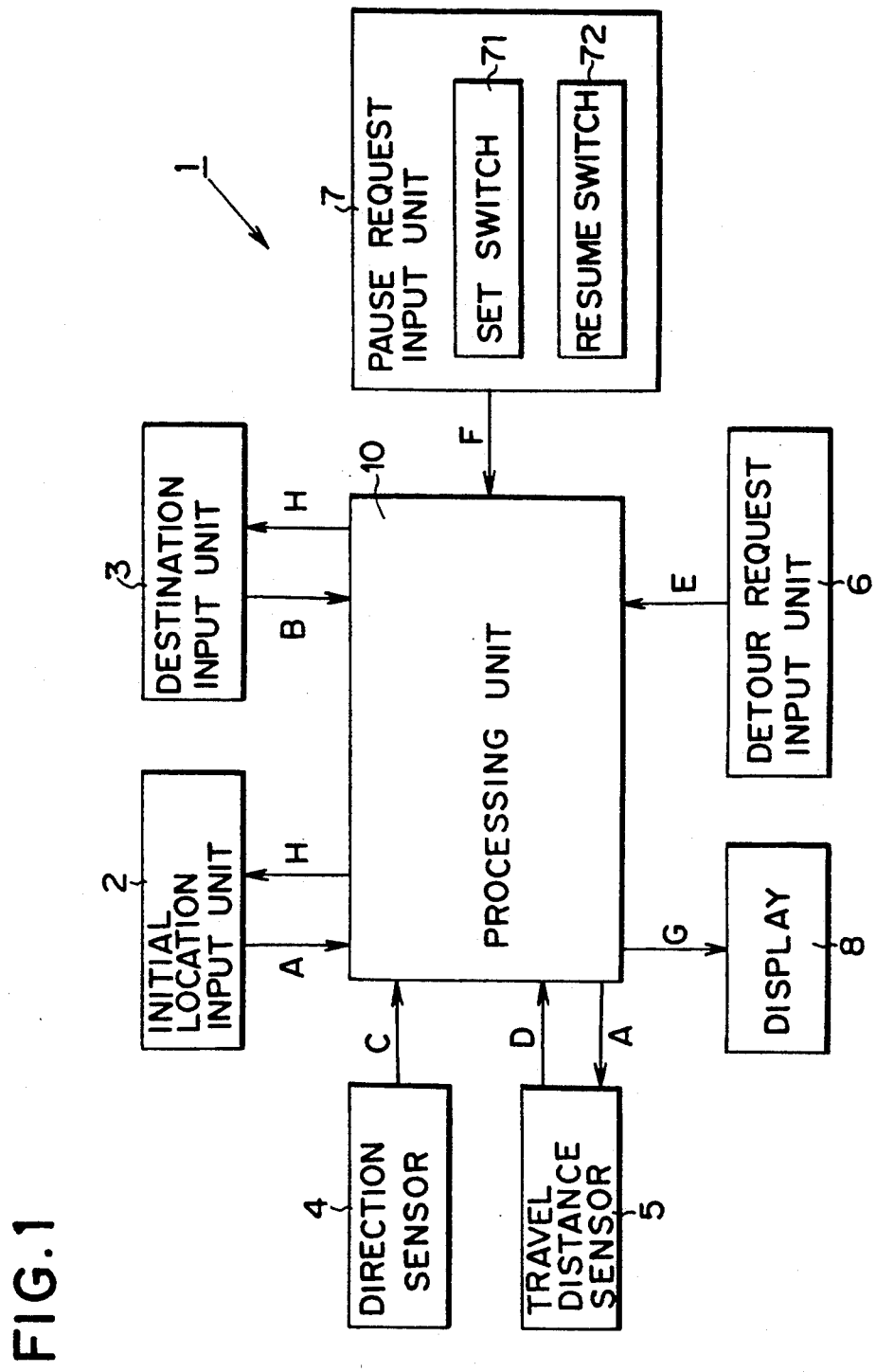
FIG. 1 is a schematic block diagram of an embodiment of the vehicle navigation system according to the invention.

FIG. 1 is a schematic diagram showing the overall arrangement of the vehicle navigation system 1 according to the present invention, in which reference numeral 2 is an initial location input unit for setting initial location data A indicating the initial location of the vehicle (not shown) equipped with the vehicle navigation system 1, 3 is a destination input unit for setting destination data B indicating the destination, 4 is a direction sensor for outputting direction data C indicating the travel direction of the vehicle at each instant, 5 is a travel distance sensor for outputting distance data D indicating the distance traveled from the initial location indicated by the initial location data A, and 6 is a detour request input unit for producing a detour request signal E for having the vehicle navigation system 1 provide guidance to the destination along a route other than the route that it has already calculated and is currently guiding the vehicle along.

The data A to D and the signal E are input to a processing unit 10 wherein a route calculator calculates the route from the initial location input to the desired destination. The processing unit 10 outputs route guidance display data G as required for driving the vehicle along the calculated route, progressively and with appropriate timing with respect to the location of the vehicle at each instant. The data G are sequentially displayed on a display 8 in the course of vehicle travel for instructing the operator in which direction to proceed.

The vehicle navigation system 1 is provided with a pause request input unit 7 for enabling the operator to suspend the route calculation if, during the time that the vehicle navigation system 1 is sequentially providing route guidance in the aforesaid manner, he or she should decide to deviate from the original route for stopping by a service station, restaurant or the like. During the time the vehicle is off the original route, it is therefore possible to prevent the vehicle navigation system 1 from making another calculation for determining the route to the destination from the off-route location of the vehicle.

The pause request input unit 7 has a pause switch 71 and a resume switch 72, the former of which the operator operates for requesting a pause and the latter of which he operates for resuming the guidance operation. Operation of the pause request input unit 7 causes an operation halt/resume signal F to be input to the processing unit 10 for temporarily halting/resuming the route calculation operation.

Figure 2:
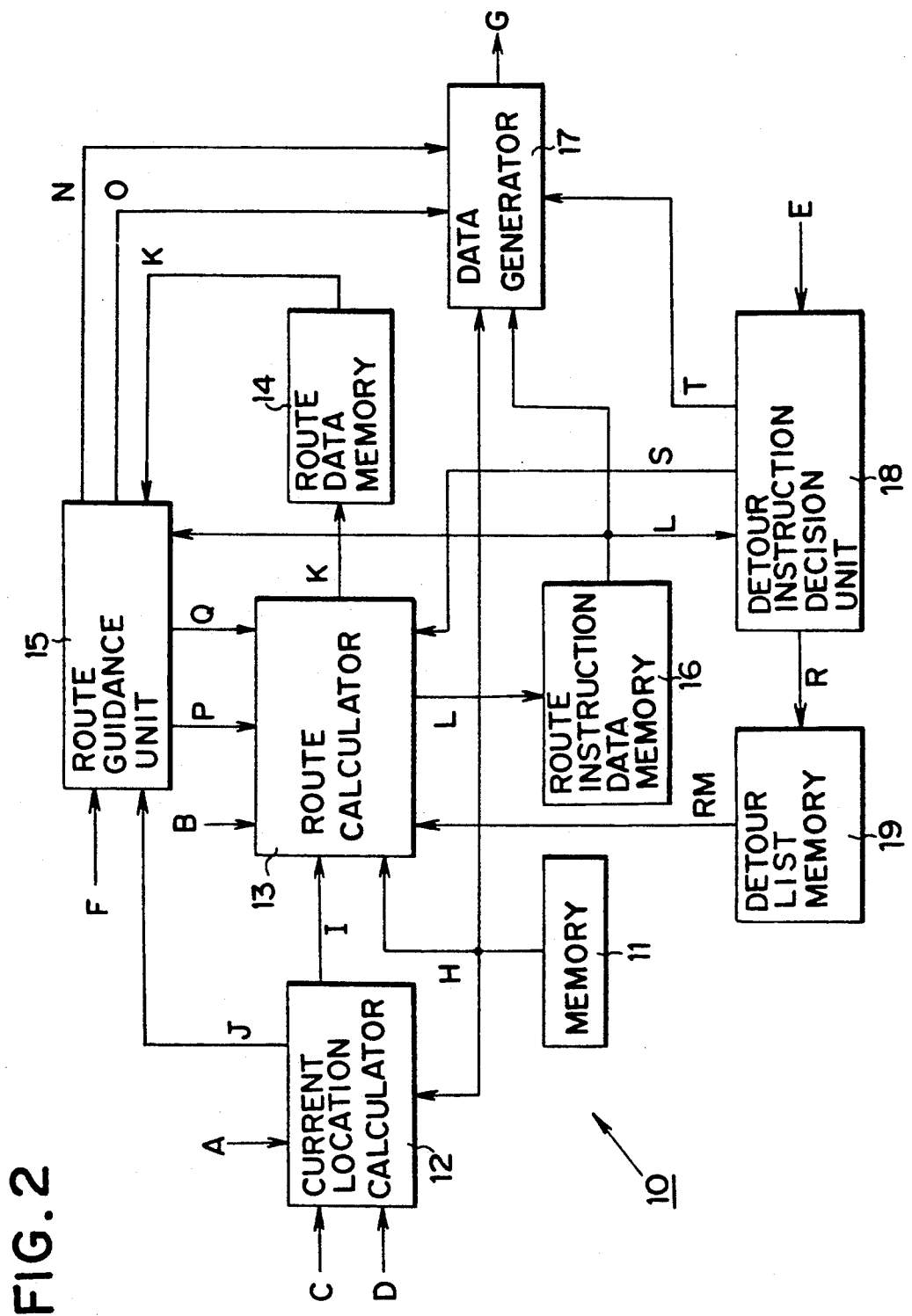
FIG. 2 is a block diagram showing the processing unit of the embodiment of FIG. 1 in detail.

FIG. 2 shows how the processing unit 10 is constituted. The arithmetic processing unit 10 comprises a memory 11 for storing road map information in the form of digital data and a current location calculator 12 for calculating the current location of the vehicle at each instant using the direction data C and the travel distance data D.

The road map information is compiled in the form of a map data base representing the road network of a prescribed region in terms of segments and nodes (at the opposite ends of the segments). The data processing for providing route guidance is conducted on the basis of this data base.

At the time of system startup, the initial location input unit 2 inputs the initial location data A to the current location calculator 12 as data indicating the location of the vehicle at that time. The initial location data A may be in the form of the latitude and longitude of the vehicle location. Alternately, in can be input in the form of an address. In the latter case, the current location calculator 12 is provided with a data conversion means for converting the address data to the corresponding latitude and longitude in the road map data. It is also possible to use an arrangement in which a map of the region is displayed on the display 8, the operator designates a point on the map as the current location using an appropriate means, and data corresponding to the latitude and longitude of the designated point is generated and input to the current location circulator 12.

The destination data B is similarly input from the destination input unit 3 to a route calculator 13.

Once data indicating the initial location of the vehicle has been input in the foregoing manner, the current location calculator 12 calculates the continually changing current location of the vehicle as the vehicle is driven by integrating the direction data C and the distance data D that it receives instant by instant as the vehicle travels. Thus the current location of the vehicle is constantly ascertained. The current location calculator 12 outputs the result of its current location calculation as first data I. The first data I produced by the calculation in the current location calculator 12 and indicating the current vehicle location is input to the route calculator 13, which also receives the destination data B and map data H, and a calculation is carried out in the route calculator 13 for determining the route the vehicle should follow between the initial location and the destination. The resulting route data K is once stored in a route data memory 14, from where it is forwarded to a route guidance unit 15.

In the route calculation, a graph search algorithm is used in conjunction with a graph based on the map data H representing intersections as nodes and roads as segments so as to solve for the optimum route. As regards the node-related cost in each of the routes calculated in the route search process, it is possible to establish various conditions such as that the aim is to minimize travel time, travel distance or number of turns or to avoid use of expressways.

The route data obtained through the calculation consists of the segments and a list of the nodes that the calculation determines are to be passed through and the route is indicated as an array of data pairs each consisting of a node and the number of a segment branching from the node. Among the route data obtained in this way, only that data required for indicating the route is output as route data K and stored in the route data memory 14. More specifically, only data relating the points where it is necessary to make a right, left or U turn and to points where the street name changes during straight line travel are derived and output as the route data K for storage in the route data memory 14.

So as to provide the guidance required for the operator to drive the vehicle along the calculated route, the route calculator 13 also generates route instruction data L for enabling instructions to be displayed prior to each intersection as to the direction in which the vehicle is to proceed. The route instruction data L is once stored in a route instruction data memory 16, from where it is forwarded to the route guidance unit 15.

Figure 3:
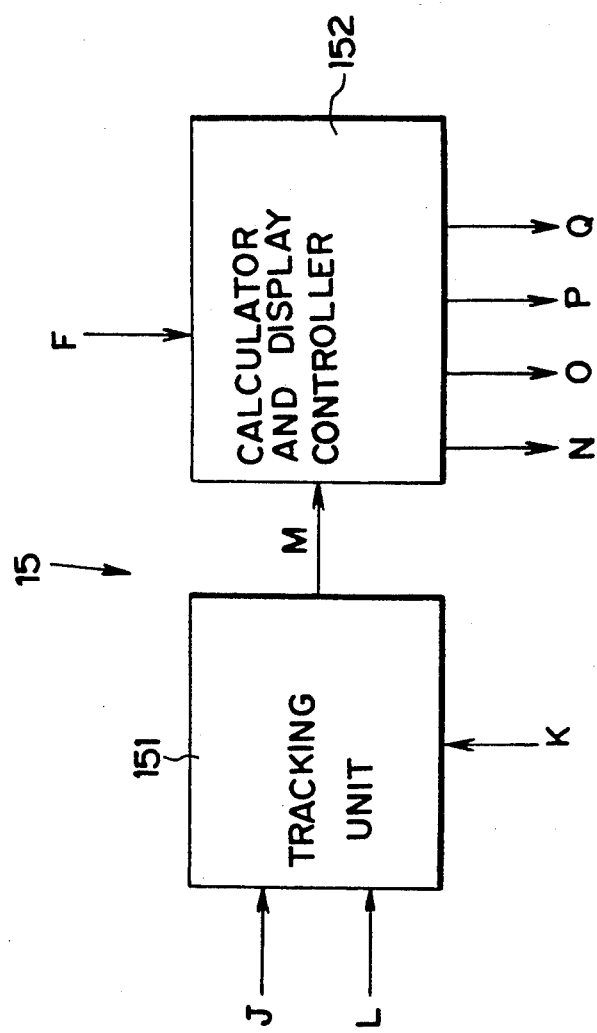
FIG. 3 is a block diagram showing the route guidance unit of the processing unit of FIG. 2 in detail.

As shown in FIG. 3, the route guidance unit 15 comprises a tracking unit 151 and a calculator/display controller 152. The tracking unit 151 outputs tracking data M in response to the route data K, the route instruction data L and second data J indicating the direction and travel distance at the current location calculated in the current location calculator 12. The tracking data M includes information regarding whether or not the vehicle is at a location requiring route instructions, whether the vehicle is on or off the route and whether or not the vehicle has reached the destination, and is supplied from the tracking unit 151 to the calculator/display controller 152. In addition to receiving the tracking data M, the calculator/display controller 152 also receives the halt/resume signal F. When the tracking data M indicates that the vehicle is in a condition requiring issuance of route instructions, the calculator/display controller 152 produces an instruction generation command signal N which is forwarded to a data generator 17 (see FIG. 2) for generating route instruction data.

When the tracking data M indicates that the vehicle has deviated from the route, the calculator/display controller 152 produces a display control signal O for displaying the fact that the vehicle is off route on the display 8 and forwards the same to the data generator 17. After the lapse of a prescribed time period (e.g. 2 seconds) following the issuance of the display control signal 0, the calculator/display controller 152 discriminates whether or not the halt/resume signal F indicates that a pause request has been made and if the result of the discrimination is affirmative, it produces a pause (halt) signal P and forwards the same to the route calculator 13 for preventing the route calculator 13 from conducting route recalculation. On the other hand, if the result of the discrimination is negative (no pause request made), the calculator/display controller 152 produces a recalculation command signal Q and forwards the same to the route calculator 13 for having the route calculator 13 calculate the route between the off-route location and the destination. (If the deviation from the route occurs immediately before a resume request is made, the recalculation command signal Q is issued immediately.)

Returning to FIG. 2, when the data generator 17 has received an instruction generation command signal N in the foregoing manner, it uses the route instruction data L for producing image data for displaying the required route instruction and outputs the same as route guidance display data G. On the other hand, if the vehicle has deviated from the route, it is possible to indicate the off-route location on a map displayed on the display 8.

Reference numeral 18 designates a detour instruction decision unit responsive to the detour request signal E for producing detour list data R and forwarding the same to a detour list memory 19. The route calculator 13 reads out detour list data RM from the detour list memory 19. The detour instruction decision unit 18 also sends a detour calculation command signal S to the route calculator 13 for having it calculate the detour route and a command signal T to the data generator 17 for having it generate route instruction data for the detour route.

The operation of the vehicle navigation system 1 shown in FIG. 1 will now be explained.

After the current vehicle location and the desired destination have been input via the initial location input unit 2 and the destination input unit 3, the route calculator 13 conducts a calculation for determining the route the vehicle should follow (referred to as the "original route"). Route instruction data L representing instructions for guidance along the original route are then stored in the route instruction data memory 16.

Figure 4:
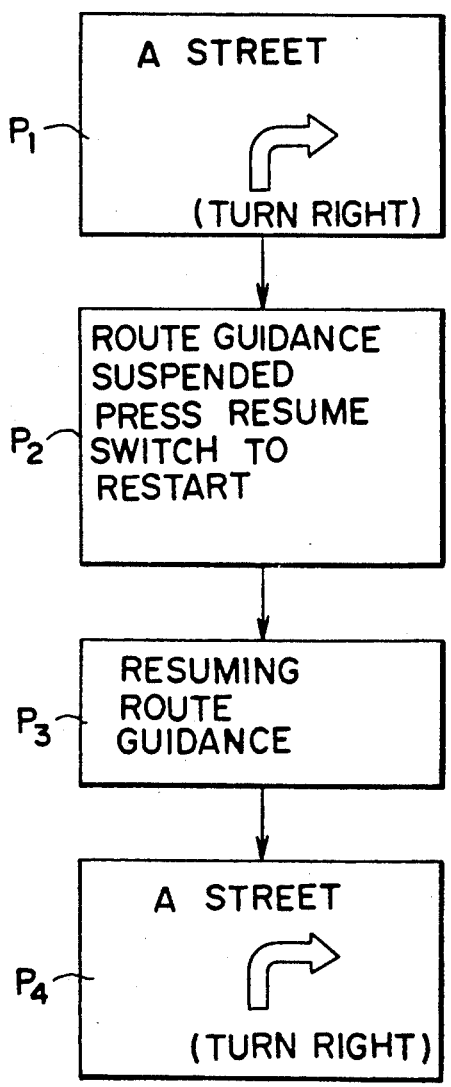
FIG. 4 is a diagram for explaining the operation of the navigation system of FIG. 1.

After the vehicle has driven off, the current location calculator 12 continuously calculates the current vehicle location instant by instant and the calculated route and the actual vehicle location are compared in the route guidance unit 15. In accordance with the result of this comparison, the route instruction data L indicating the direction in which the vehicle should proceed is successively sent to the data generator 17 as the vehicle navigates the route. As a result, route guidance is displayed at appropriate times in the course of vehicle travel. As shown in FIG. 4, this guidance typically appears in the form of instructions such as "Turn left on A Street."

If during the display of route guidance such shown at P1 in FIG. 4 the operator should press the pause switch 71 of the pause request input unit 7 because, for example, he wants to deviate from the route in order to refuel at a service station, the displayed image changes to one such as shown at P2. The route guidance unit 15 outputs the pause signal P so that the route calculation operation based on the first data I indicating the current vehicle location is suspended. The content of the route instruction data memory 16 is thus retained as it is.

Because of this, the route instruction data and the route data remain unchanged notwithstanding that the vehicle thereafter deviates from the original route. Once the operator has accomplished his purpose and driven the vehicle back on to the original route, he presses the resume switch 72 of the pause request input unit 7. This causes output of the pause signal P to be discontinued and an image such as that shown at P3 to be displayed for informing the operator that route guidance has been resumed. Then, as shown at P4, a guidance image identical with that just before the vehicle deviated from the original route is displayed.

Thus when the operator desires to leave the original route with the intention of returning to it later, he need only press the pause switch 71 for preventing a recalculation from being conducted in response to the deviation from the route. When he returns to the original route, he need only press the resume switch 72 for restoring the route guidance operation.

Figure 5:
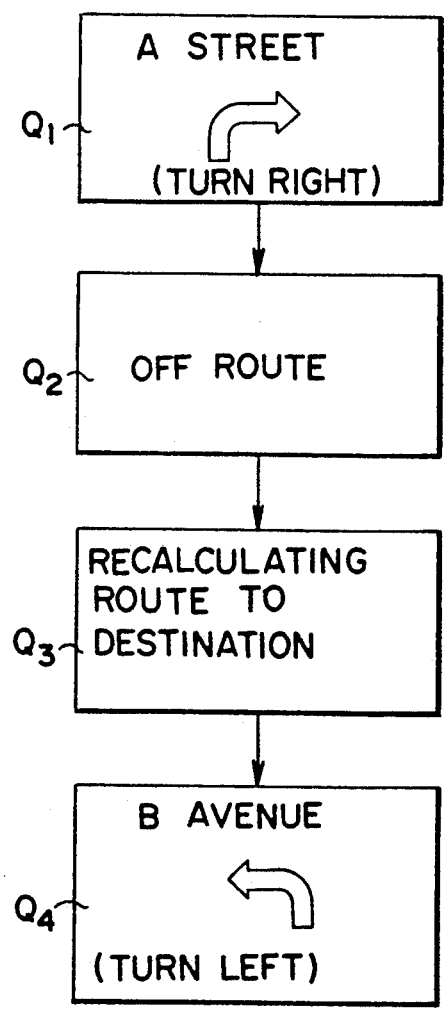
FIG. 5 is another diagram for explaining the operation of the navigation system of FIG. 1.

The operation of the system when the vehicle leaves the route owing to an error will now be explained with reference to FIG. 5. If the vehicle should deviate from the route during display of the route guidance image Q1 in FIG. 5, the fact that the vehicle has gone off route will be displayed in the form of the image Q2. Although not shown in FIG. 5, the operator is then notified that the route guidance can be suspended by pressing the pause switch 71 and that a route recalculation will be conducted if he does not press the pause switch 71 within so many seconds.

If the operator presses the pause switch 71 at this time, the situation becomes that explained earlier with respect to image P2 in FIG. 4. If he does not, a route recalculation is begun and the image Q3 is displayed for indicating that the calculation is in progress.

After the route recalculation has been completed, the image Q4 providing route guidance based on the newly calculated route is displayed. Since the route guidance provided in line with the route recalculation after deviation from the original route is similar to that for the original route discussed earlier, it will not be explained in detail here.

As explained in the foregoing, the route guidance can be suspended by pressing the pause switch 71 either at or just before deviating from the route and can then be resumed simply by pressing the resume switch 72. This ability to restore the route guidance without need for complicated operations makes the system highly convenient in cases where the operator for some reason or other wishes to deviate from the route temporarily prior to reaching the destination.

It is possible that after leaving the route the operator may return to it at some point other than that at which he or she left it. In this case, too, if the resume switch 72 is pressed after having returned to the original route, the route guidance will be resumed automatically.

Figure 9:
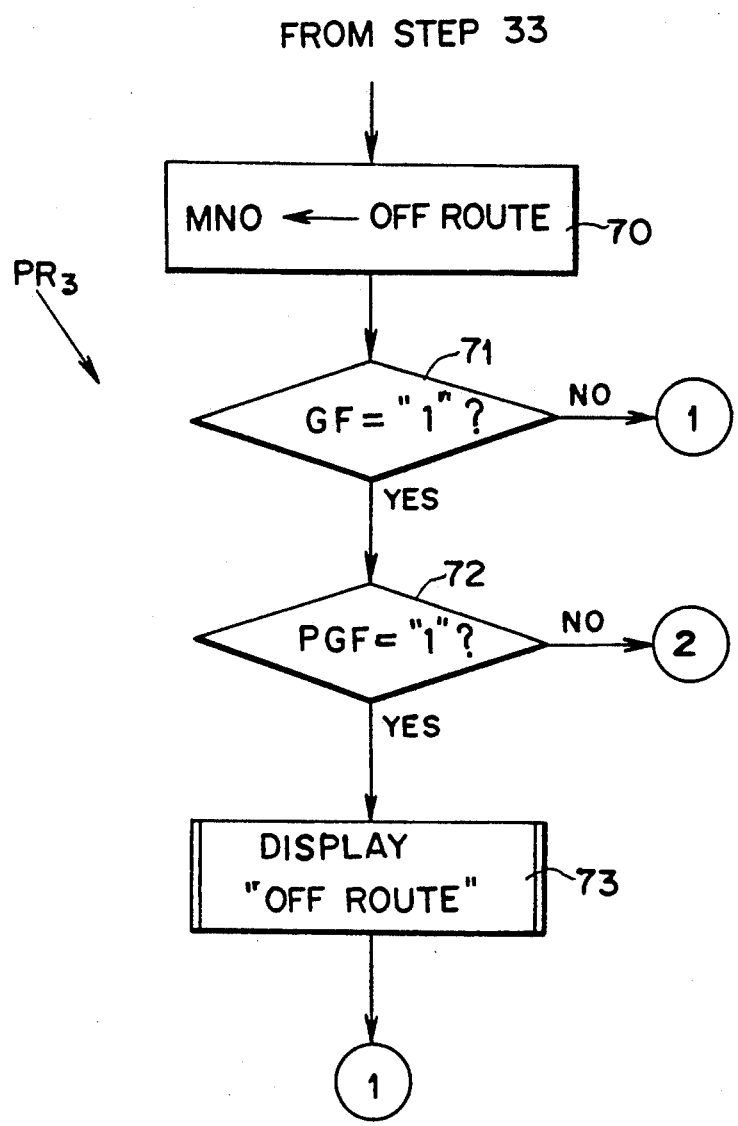
FIG. 9 shows additional steps of the program of FIG. 6.
Figure 10:
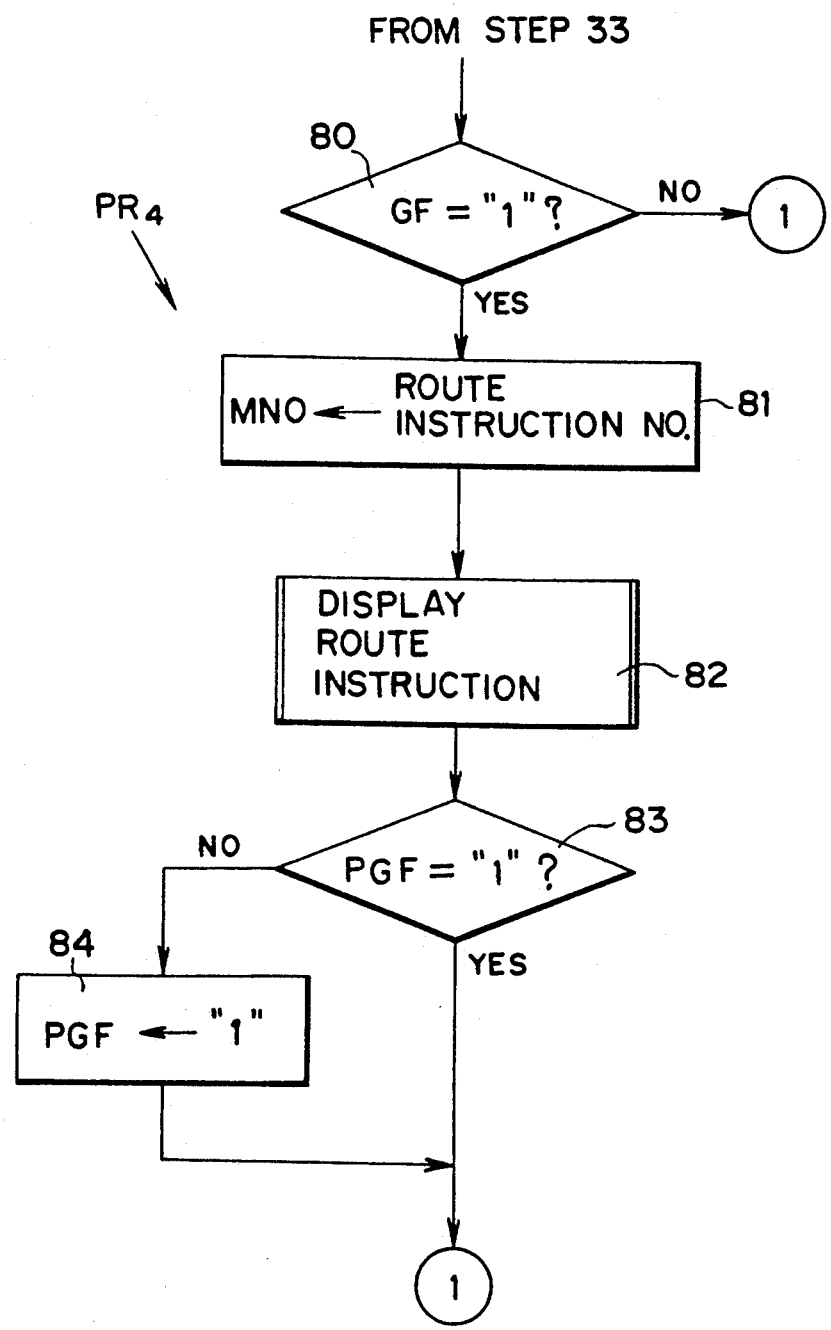
FIG. 10 shows additional steps of the program of FIG. 6.

The functions of the processing unit 10 shown in FIG. 10 can be achieved by a microcomputer system including a microcomputer of a known type capable of executing a prescribed program. Flow charts of a processing program for use in the case where the processing unit 10 is constituted as a microcomputer system are shown in FIGS. 6 to 11. When this arrangement is employed, the hardware of the processing unit 10 becomes the well-known microcomputer itself and, therefore, no description will be made regarding the circuitry involved.

Figure 6:
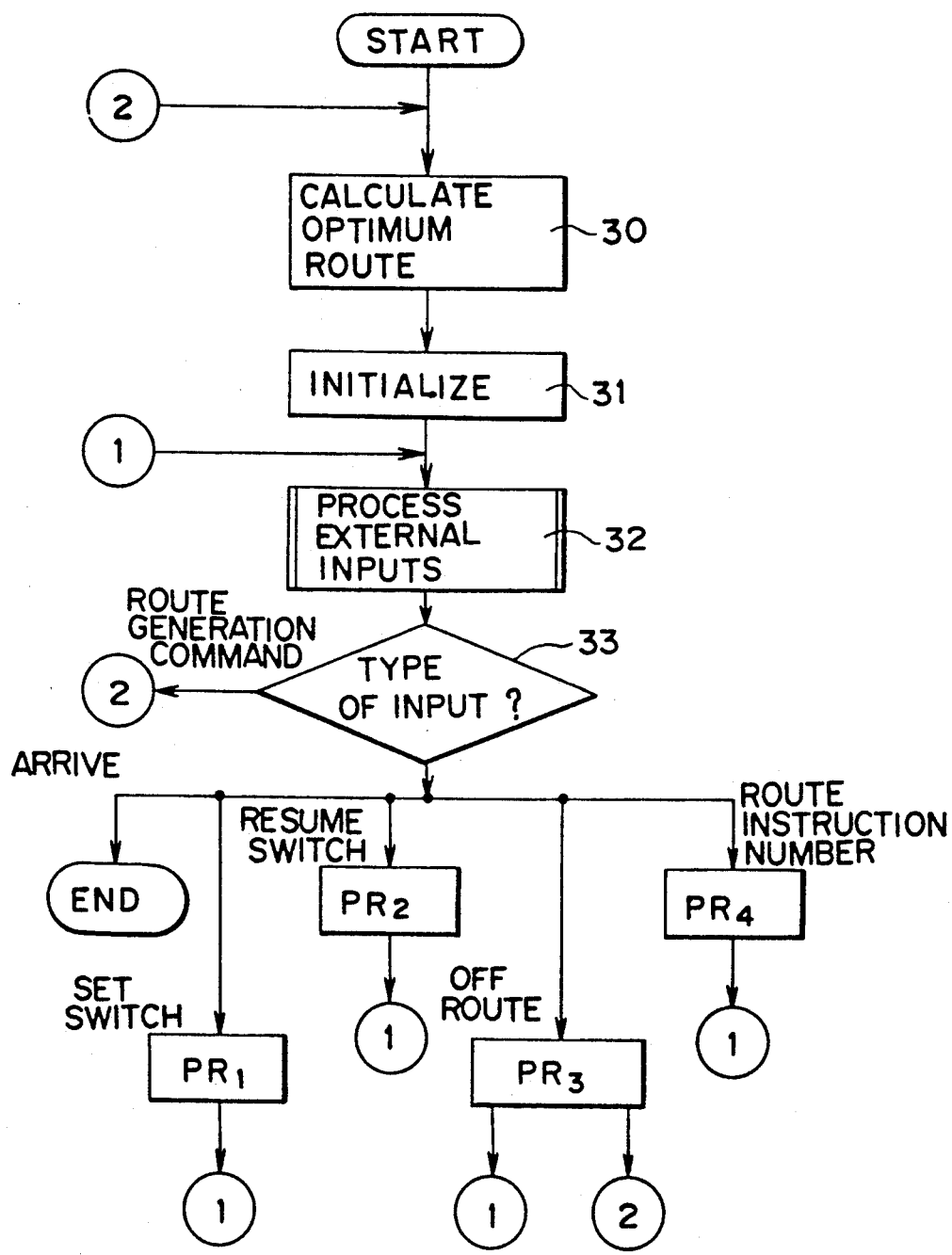
FIG. 6 is a flow chart showing a program executed when the vehicle navigation system of the invention is constituted using a microcomputer.

The program shown by the flow chart of FIG. 6 is executed periodically. The program begins with step 30 in which the optimum route between the current vehicle location and the destination is calculated on the basis of the input data and road map information stored in an unshown internal memory of the microcomputer (the same road map information as stored in the memory 11 in FIG. 2). The destination is that according to the data input through the destination input unit 3 and is not changed during the navigation operation.

Initialization is then carried out in the following step 31 for clearing the variables M, N and O representing route instruction numbers as well as flags GF and PGF, whereafter control passes to step 32 in which external inputs are processed as shown in detail in FIG. 11.

Figure 11:
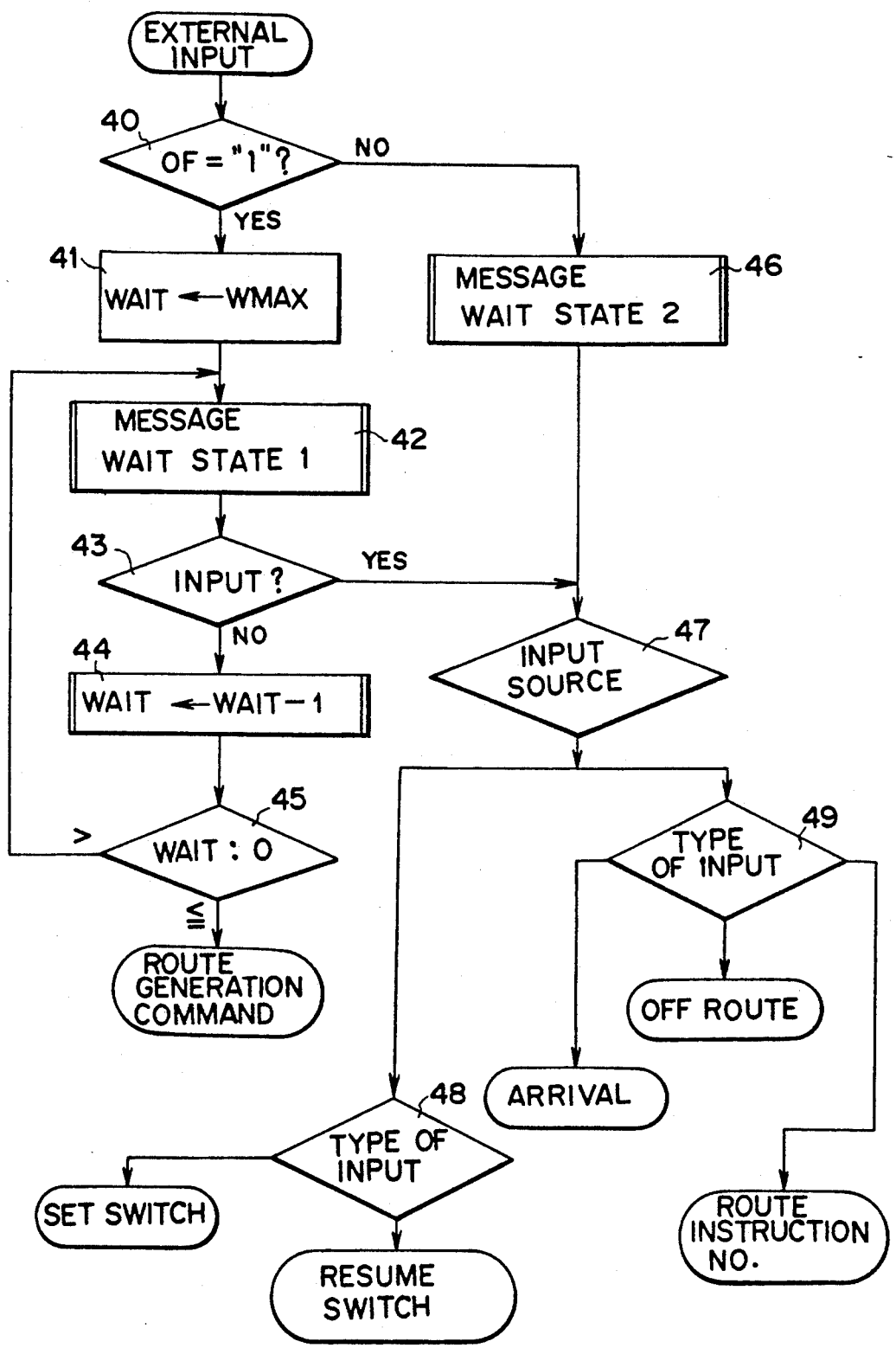
FIG. 11 shows additional steps of the program of FIG. 6.

The processing of external inputs according to the subroutine of FIG. 11 begins in step 40, where a check is made of a flag OF for indicating whether or not an off-route image is to be displayed. If the flag OF bit is set to 1, meaning that the off-route image is to be displayed, control passes to step 41. In this system, the navigation function interacts through message communication with other user key-input functions and guidance functions. The data structure of the messages is of a type called MSG (input source+input type+input value).

In the case at hand, the inputs are as follows:
(route guidance+route condition+(route instruction number|off-route condition|arrival))
(user key input+key input+(pause switch|resume switch))

A notation such as (a|b|c) here means that the value assumed is that of one of a, b and c.

The system is provided with two types of message wait states. In "message wait state 1" a check is made to see whether there is a message, and if there is, a YES and the message value are returned. If there is not, a NO is returned. In "message wait state 2," the control waits until a message comes in. During external input processing, input is ordinarily waited for in message wait state 2. However, the program is arranged so that when the bit of flag OF is 1 during display of the off-route image, a route recalculation command will be issued after a fixed time (after WMAX number of program loops). Thus the external input processing is for converting various inputs from the outside into navigation function inputs.

Once the external input processing is initiated, control first goes to step 40 in which the flag OF is checked for determining whether or not the off-route image is to be displayed. If OF is set to 1, control passes to step 41 in which WAIT is set to WMAX and then to step 42 for entering the message wait state 1. Control then passes to step 43 in which discrimination is made as to whether or not there is an input, and if there is not, to step 44 in which the value of WAIT is reduced by 1 and to step 45 which discriminates whether or not the value of WAIT has reached 0. If it has not, control returns to step 42 and the same steps are repeated until WAIT becomes 0, at which time the input is deemed to be a route generation command (i.e. a route recalculation command).

If the result of the check made in step 40 is NO, control passes to step 46 for entering the message wait state 2 and then to step 47 for discriminating the input source. Control also passes to step 47 if the result of the discrimination in step 43 is YES. Control then passes to steps 48 and 49 for discriminating whether the type of input is halt guidance (pause switch pressed), resume guidance (resume switch pressed), arrival, off route condition or route instruction number.

Control next passes to step 33 in FIG. 6, in which, according to the type of input discriminated in external input processing step 32, one of programs PR1 to PR4, program termination (END) and optimum route calculation is implemented. In the case of arrival at the destination, the program is terminated, while in the case of a route generation command, control returns to step 30.

Figure 7:
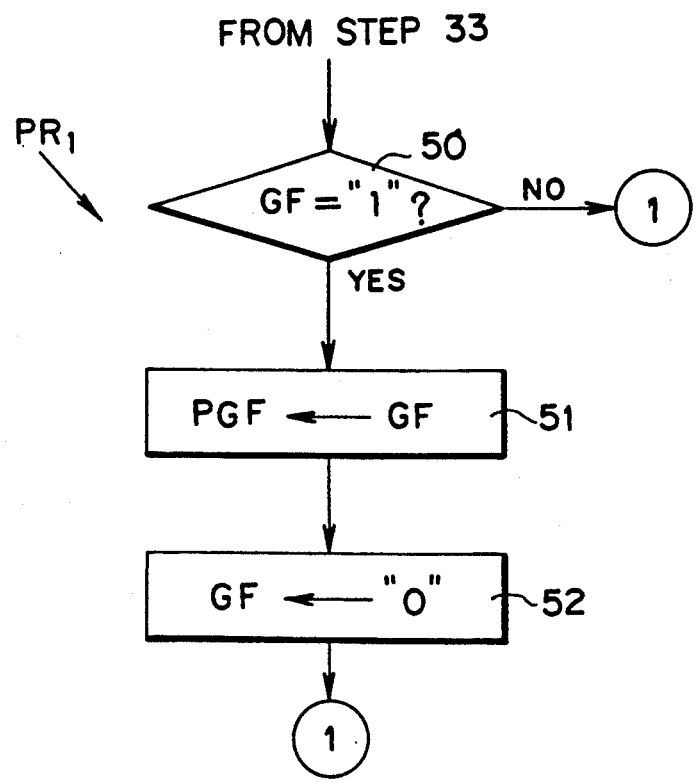
FIG. 7 shows additional steps of the program of FIG. 6.

The program PR1 executed when the pause switch 71 has been pressed starts with step 50 in FIG. 7, in which a flag GF indicating whether or not guidance is in progress is checked, and if the flag GF is set to 1 (meaning that guidance is in progress), control passes to step 51 where the content of the flag GF is set to the flag PGF indicating the guidance state one cycle earlier. Following this, the flag GF is cleared in step 52 and control returns to step 32. Control also returns to step 32 when the bit of the flag GF is found to be 0 in step 50.

Figure 8:
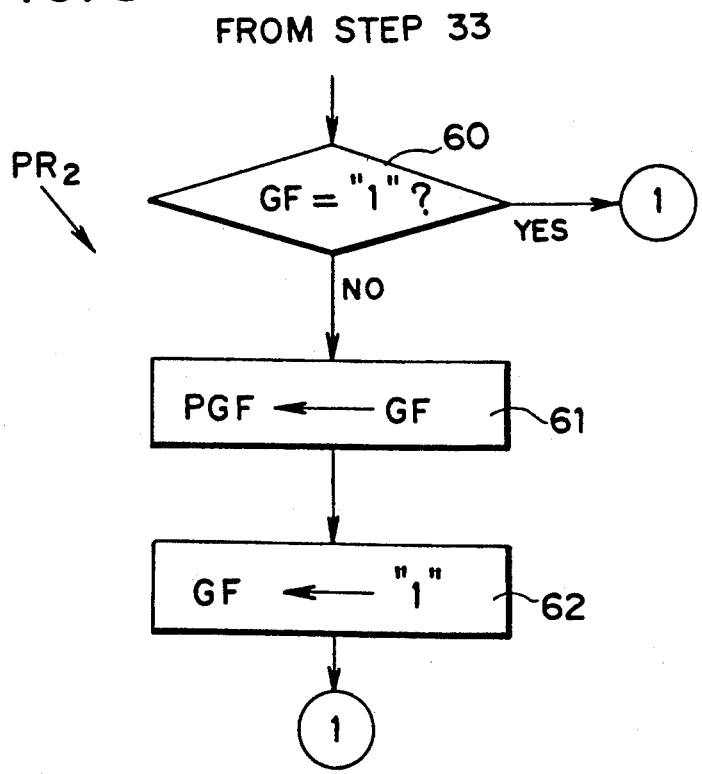
FIG. 8 shows additional steps of the program of FIG. 6.

The program PR2 executed when the resume switch 72 has been pressed starts with step 60 in FIG. 8, in which the state of the flag GF is checked and if the flag GF is set to 0, i.e. if guidance is not in progress, control passes to step 61 in which the content of the flag GF is replaced with that of the flag PGF indicating the guidance state one cycle earlier. Following this, the flag GF is set in step 62 and control returns to step 32. Control also returns to step 32 when the bit of the flag GF is found to be 1 in step 60.

The program PR3 executed when the vehicle is off route starts with step 70 in FIG. 9, in which the content of MNO is set to "off route." Control then passes to step 71 in which the flag GF is checked as to whether it is set to 1. If the flag GF is set to 0, control returns to step 32, and if it is set to 1, control passes to step 72 in which it is discriminated whether or not the flag PGF is set to 1.

If the flag PGF is found to be set to 1, control passes to step 73 in which the message "Off route" is displayed. Control then returns to step 32. If the flag PGF is found to be set to 0 in step 72, control is returned to step 30. In other words, it is determined in steps 71 and 72 whether or not guidance was just resumed, and if it was, the optimum route is calculated in step 30.

The program PR4 executed in the case of a route instruction number starts with step 80 in FIG. 10, in which it is discriminated whether the bit of flag GF is 1 or 0, and if it is 0, control returns to step 32. If it is 1, the content of MNO is set to "route instruction number" in step 82 and the route instruction is displayed in step 82. Control then passes to step 83 in which it is discriminated whether the bit of the flag PGF is 1 or 0, and if it is 1, control returns to step 32. If it is 0, control is returned to step 32 after the flag PGF has been set to 1 in step 32.

The operations in accordance with the flow charts of FIGS. 6 to 11 provide the same route guidance and the same effect as the system of FIG. 1.

As will be understood from the foregoing, the invention provides a highly user-friendly navigation system which, by allowing the operator to prevent route recalculation at the time he or she deliberately deviates from the route currently being followed, enables him or her to restore the guidance along the same route as soon as returning to it, simply without need for complex operations.

What is claimed is:

1. A vehicle navigation system comprising:
   first means for inputting initial location data indicating an initial location of the vehicle,
   memory means for storing road map information,
   second means for inputting destination data indicating a destination,
   calculation means responsive to the first means, the memory means ant he second means for calculating an original route from the initial location to the destination,
   storage means for storing the result of said calculation by the calculation means,
   output means for outputting current location data indicating a current location of the vehicle,
   display means responsive to the storage means and the output means for sequentially displaying directions necessary for traveling along the original route at each instant as the vehicle travels,
   command means for commanding the calculation means to calculate a new route from the current location to the destination and causing the new route to be stored in the storage means when the vehicle deviates from the original route as determined by comparing the current location data with the original route, and
   halt/resume means for halting the calculation of the new route and resuming the operation of the calculating means for calculating the original route when the vehicle has temporarily deviated from the original route.

2. A vehicle navigation system as claimed in claim 1, wherein the destination data is expressed in latitude and longitude.

3. A vehicle navigation system as claimed in claim 1, wherein the destination data is expressed in the form of an address.

4. A vehicle navigation system as claimed in claim 1, wherein the halt/resume means comprises a halt means for outputting a signal for stopping the operation of the calculation means, and a resume means for outputting a signal for resuming the operation of the calculation means.

5. A vehicle navigation system as claimed in claim 1, wherein said deviation of the vehicle from the original route causes an off-route message to be displayed on the display means.

6. A vehicle navigation system as claimed in claim 5, wherein said deviation of the vehicle from the original route further causes a further message to be displayed on the display means, said further message being that route guidance can be discontinued by operating the halt/resume means.

7. A vehicle navigation system as claimed in claim 1, wherein the output means calculates the current location of the vehicle in response to the initial location data, direction data indicating a vehicle travel direction, and distance data indicating a distance traveled by the vehicle.

8. A vehicle navigation system as claimed in claim 7, wherein the initial location data is expressed in latitude and longitude.

9. A vehicle navigation system as claimed in claim 7, wherein the initial location is expressed in the form of an address.

* * * * *